United States Patent
Reznichenko et al.

(10) Patent No.: US 6,987,561 B2
(45) Date of Patent: Jan. 17, 2006

(54) SYSTEM AND APPARATUS FOR TESTING A MICROMACHINED OPTICAL DEVICE

(75) Inventors: Yakov Reznichenko, Newton, MA (US); Aaron Lowenberger, Brookline, MA (US)

(73) Assignee: Analog Devices, Inc., Norwood, MA (US)

( * ) Notice: Subject to any disclaimer, the term of this patent is extended or adjusted under 35 U.S.C. 154(b) by 377 days.

(21) Appl. No.: 10/131,602

(22) Filed: Apr. 24, 2002

(65) Prior Publication Data
US 2003/0202177 A1    Oct. 30, 2003

(51) Int. Cl.
*G01N 21/88* (2006.01)

(52) U.S. Cl. .................... 356/237.2; 356/445

(58) Field of Classification Search ............ 356/237.1, 356/445–448; 250/201.3, 201.4, 201.6
See application file for complete search history.

(56) References Cited

U.S. PATENT DOCUMENTS

| | | | | |
|---|---|---|---|---|
| 4,230,940 A | * | 10/1980 | Minami et al. | 250/201.4 |
| 4,356,392 A | * | 10/1982 | Wittekoek et al. | 250/201.4 |
| 4,720,191 A | * | 1/1988 | Siegel et al. | 356/237.1 |
| 6,052,197 A | * | 4/2000 | Drake | 356/445 |

OTHER PUBLICATIONS

Honer, et al., A High-Resolution Laser-Based Deflection Measurement System for Characterizing Aluminum Electrostatic Actuators.

* cited by examiner

*Primary Examiner*—Richard A. Rosenberger
(74) *Attorney, Agent, or Firm*—Bromberg & Sunstein LLP (57) ABSTRACT

A system and apparatus for testing a micromachined optical device includes a computerized test station that generates signals to control the micromachined optical device as well as various test equipment and analyzes signals generated by the micromachined optical device and various test equipment. The computerized test station typically provides for both manual and automated testing of the micromachined optical device. In order to test the micromachined optical device, various optical measurement devices are typically mounted on a frame. The frame is configured so as to maintain proper alignment between the optical measurement devices and the micromachined device under test. The frame is mounted to or integral with a focusing device. The frame moves along with focusing movements of the focusing device in such a way that the optical measurement devices are properly aligned with the micromachined device under test when the focusing device is focused on the micromachined device under test.

21 Claims, 9 Drawing Sheets

SYSTEM AND APPARATUS FOR TESTING A MICROMACHINED OPTICAL DEVICE

FIELD OF THE INVENTION

The present invention relates generally to a system and apparatus for testing a micromachined optical device.

BACKGROUND OF THE INVENTION

Micro Electro-Mechanical Systems (MEMS) for use in optical switching applications typically contain optical mirrors that are controllable electronically. The optical mirrors are typically micro-machined from a silicon wafer and coated with various materials to produce a reflective mirror surface. The mirror structure is typically bonded onto a substrate, and the resulting structure is typically packaged within a glass-covered package. The glass allows light to pass to and from the optical mirrors.

A technique for testing aluminum electrostatic actuators is described in "A High-Resolution Laser-Based Deflection Measurement System for Characterizing Aluminum Electrostatic Actuators," Proceedings of Transducers 1995, Stockholm, Sweden, pp. 308–311, which is hereby incorporated herein by reference in its entirety. Specifically, a laser beam is directed through an attenutator, a beam splitter and a lens onto an actuator. The reflected beam passes back through the lens and is directed by the beam splitter onto two photodiodes. Changes in the position of the actuator are detected as changes in the amount of illumination of the two photodiodes.

U.S. Pat. No. 6,052,197, "Apparatus for Wafer Level Testing of a Micromachined Device," Apr. 18, 2000, which is hereby incorporated herein by reference, describes a technique for wafer level testing of a micromachined device. A control station is coupled to an electro-optical assembly that has been designed for the purpose of testing mirrors. Three standard probes are coupled to the electro-optic probe assembly to provide electrical connections to a particular mirror of a wafer under test. Optical components are coupled to the electro-optic probe to deliver laser light to a deflectable plate portion of the mirror. Displacement of the reflected laser light spot is detected as the mirror plate is vectored and this displacement is compare to specifications such that the mirror under test can be either accepted or rejected.

As discussed in U.S. Pat. No. 6,052,197, the technique for testing aluminum electrostatic actuators can be used to test optical mirrors in MEMS devices.

SUMMARY OF THE INVENTION

In accordance with one aspect of the invention, testing of the MEMS device is controlled through a computerized test station. A computer generates signals to control the MEMS device as well as various test equipment and analyzes signals generated by the MEMS device and various test equipment. Under control of a computer program, the computer typically provides for both manual and automated testing of the MEMS device.

In accordance with another aspect of the invention, various optical measurement devices are mounted on a frame. The frame is configured so as to maintain proper alignment between the optical measurement devices and a micromachined device under test. The frame is mounted to or integral with a focusing device. The frame moves along with focusing movements of the focusing device in such a way that the optical measurement devices are properly aligned with the micromachined device under test when the focusing device is focused on the micromachined device under test.

In accordance with another aspect of the invention, an optical measurement apparatus includes a focusing device having disposed thereon a frame for mounting at least one optical measurement device. The frame moves along with focusing movements of the focusing device, and is configured in such a way that the at least one optical measurement device is aligned with a micromachined device under test when the focusing device is focused on the micromachined device under test. The frame may be integral to the focusing device or mounted to the focusing device. The focusing device is typically a microscope. The at least one optical measurement device may be an optical collimator that directs a light beam to an optical mirror of the micromachined device under test. The at least one optical measurement device may be a detector, such as an infrared optical detector or an angular measurement detector, that receives a light beam reflected off of an optical mirror of the micromachined device under test. The optical measurement system may additionally include at least one processing device for processing output signals produced by the detector. The at least one processing device may include a position sensing amplifier, a digitizer, and/or a computer. The optical measurement system may additionally include at least one laser for producing the light beam. The laser may operate in the visible spectrum or the infrared spectrum. The computer may generate control signals for controlling the micromachined device under test and/or process the output signals produced by the detector. The computer is typically programmed to present the processed output signals in a selected format.

In accordance with another aspect of the invention, an apparatus is mountable on a focusing device for optical measurements of micromachined device. The apparatus includes at least one mounting arm for mounting at least one optical measurement device. The apparatus is configured in such a way that the at least one optical measurement device is aligned with a micromachined device under test when the focusing device is focused on the micromachined device under test.

In accordance with another aspect of the invention, an apparatus includes focusing means for focusing on a micromachined device under test and a frame for mounting at least one optical measurement device. The frame moves along with focusing movements of the focusing means, and is configured in such a way that the optical measurement devices are aligned with a micromachined device under test when the focusing means is focused on the micromachined device under test. The frame may be integral to the focusing means or mounted to the focusing means. The focusing means typically includes a microscope.

In accordance with another aspect of the invention, an apparatus for testing a micromachined optical device includes control logic for controlling the position of an optical mirror of the micromachined optical device, data acquisition logic for receiving signals from at least one optical measurement device, and analysis logic for analyzing the received signals based upon at least the position of the optical mirror of the micromachined optical device. The control logic may cycle the optical mirror of the micromachined optical device through a plurality of positions, in which case the analysis logic typically the received signals when the optical mirror of the micromachined optical device is at each of the plurality of positions. The mirror positions can be determined by an automated program or by information entered manually.

In accordance with another aspect of the invention, a computer program for testing a micromachined optical device includes control logic for controlling the position of an optical mirror of the micromachined optical device, data acquisition logic for receiving signals from at least one optical measurement device, and analysis logic for analyzing the received signals based upon at least the position of the optical mirror of the micromachined optical device. The control logic may cycle the optical mirror of the micromachined optical device through a plurality of positions, in which case the analysis logic typically the received signals when the optical mirror of the micromachined optical device is at each of the plurality of positions. The mirror positions can be determined by an automated program or by information entered manually. The computer program may be a LabView program.

DETAILED DESCRIPTION OF A PREFERRED EMBODIMENT

In a typical embodiment of the present invention, testing of the MEMS device is controlled through a computerized test station. A computer generates signals to control the MEMS device as well as various test equipment and analyzes signals generated by the MEMS device and various test equipment. Under control of a computer program, the computer typically provides for both manual and automated testing of the MEMS device.

Figure 8:
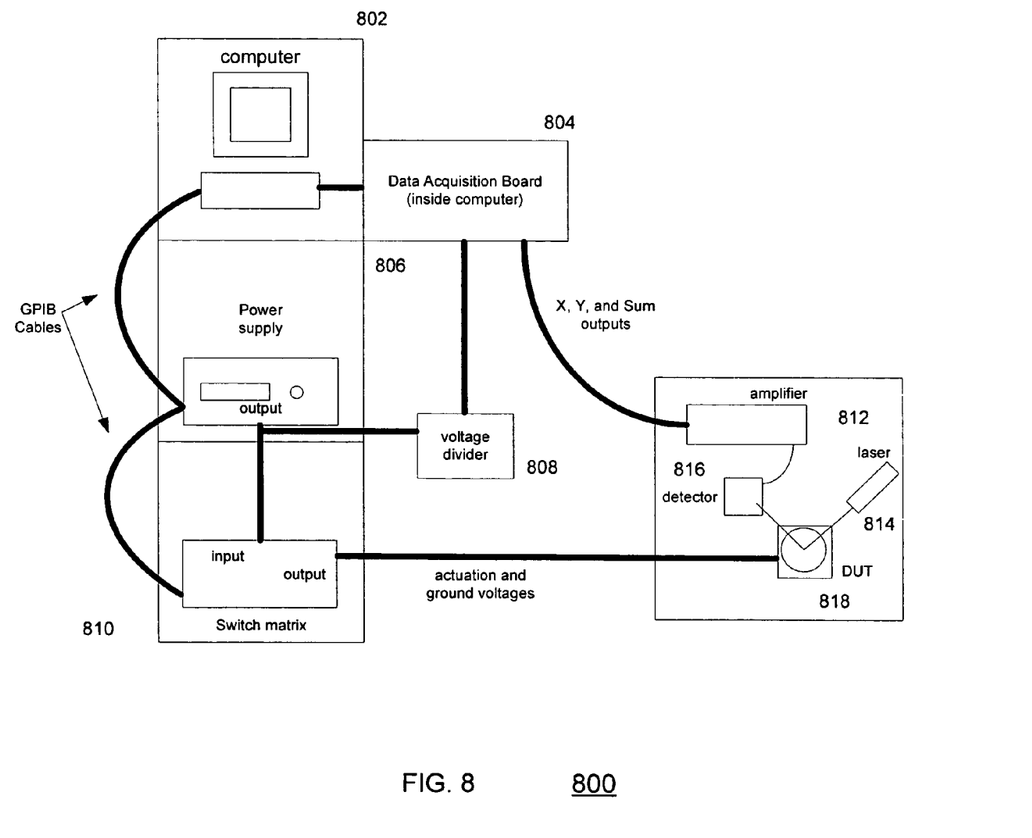
FIG. 8 shows an exemplary MEMS test system in accordance with an embodiment of the present invention.

FIG. 8 shows an exemplary MEMS test system 800 in accordance with an embodiment of the present invention. Among other things, the MEMS test system 800 includes a computer 802 with a data acquisition board 804, a power supply 806, a voltage divider 808, a switch matrix 810, an amplifier 812, a laser 814, a detector 816, a MEMS device under test (DUT), and various interconnecting cables.

Among other things, the power supply 806 is used to generate voltages for controlling the MEMS mirrors. Power supply 806 outputs are fed to both the switch matrix 810 and the voltage divider 808, both of which are described in more detail below. In an exemplary embodiment of the invention, the power supply 806 is an Agilent 6030A power supply. This is a 1000 Watt, 0–200 Volt power supply that can be controlled remotely from the computer 802 via General Purpose Interface Bus (GPIB).

The switch matrix 810 is used to route the voltage input to the different MEMS control pads to actuate the MEMS mirrors. In an exemplary embodiment of the invention, the switch matrix 810 is a Keithley 2750 multimeter/switch system configured with four (4) Keithley model 7709 6×8 matrix cards. The switch matrix 810 preferably provides connectivity to all control pins on the DUT 818, and also preferably provides for two voltage inputs, and in particular a ground input and an actuation voltage input, so that the ground input can be applied to some DUT pins while the actuation voltage is applied to other DUT pins. The switch matrix 810 can be controlled remotely from the computer 802 via GPIB.

The data acquisition board 804 is used to sample the voltage output from the amplifier 812 as well as to monitor the input voltage from the power supply 806. In an exemplary embodiment of the present invention, the data acquisition card 804 is a National Instruments PCI-MIO-16XE-50 data acquisition card. This card has sixteen analog input channels, a 20 kS/s sampling rate, and sixteen bits of resolution. A SCB-68 connector block (not shown) is typically also used to facilitate connection of the data acquisition card 804 to the voltages it is to monitor. Because the data acquisition card 804 supports only a −10 to +10 Volt range, the voltage divider 808 is used to allow the data acquisition card 804 to monitor the output of the power supply 806.

In a typical embodiment of the present invention, various optical measurement devices are mounted on a frame. The frame maintains proper alignment between the optical measurement devices and the MEMS device under test, and enables quick configuration and reconfiguration of the various optical measurement devices for various tests and measurements.

The frame is typically integral to or mounted on a focusing device in such a way that the frame moves along with focusing movements of the focusing device. The frame is typically configured in such a way that, when the focusing device is focused, the optical measurement devices are properly aligned with the MEMS device under test. For example, the frame may be configured so as aim the optical measurement devices toward a focal point of the focusing device. In this way, the optical measurement devices become properly aligned with the MEMS device under test by placing the focusing device into focus.

In one exemplary embodiment of the present invention, the focusing device is a microscope. The frame is mounted to the microscope and is configured so as to aim the optical measurement devices substantially toward the focal point of the microscope. When the microscope is focused on an optical mirror of the MEMS device, the optical measurement devices are likewise automatically focused on the optical mirror. This makes it very easy to position the optical measurement devices for various tests and measurements.

The optical measurement devices typically include at least a device for directing a light beam to an optical mirror and a device for detecting the light beam reflected off of the optical mirror. For example, an optical collimator may be mounted to the frame for directing a light beam from various optical devices, such as lasers operating in the visible or infrared range, optical fibers, a polarization controller, and an optical coupler, to the optical mirror. An optical detector, such as an infrared optical detector or angular measurement detector, may be mounted to the frame for detecting the light beam reflected off of the optical mirror.

The optical measurement devices may be used for automated measurement of optical mirror performance for such things as angular mirror positioning, mirror drifting, mirror reflectivity, and dispersion, to name but a few. For example, the optical detector may be coupled to additional devices, such as a sensing amplifier, a digitizer, and a computer, that process and analyze the detected light beam.

The microscope may be used to focus the optical measurement devices on the optical mirror and to visually inspect the optical mirror. For example, the microscope may be used to view the position and shape of a light beam produced by the optical measurement devices on the optical mirror.

Figure 1A:
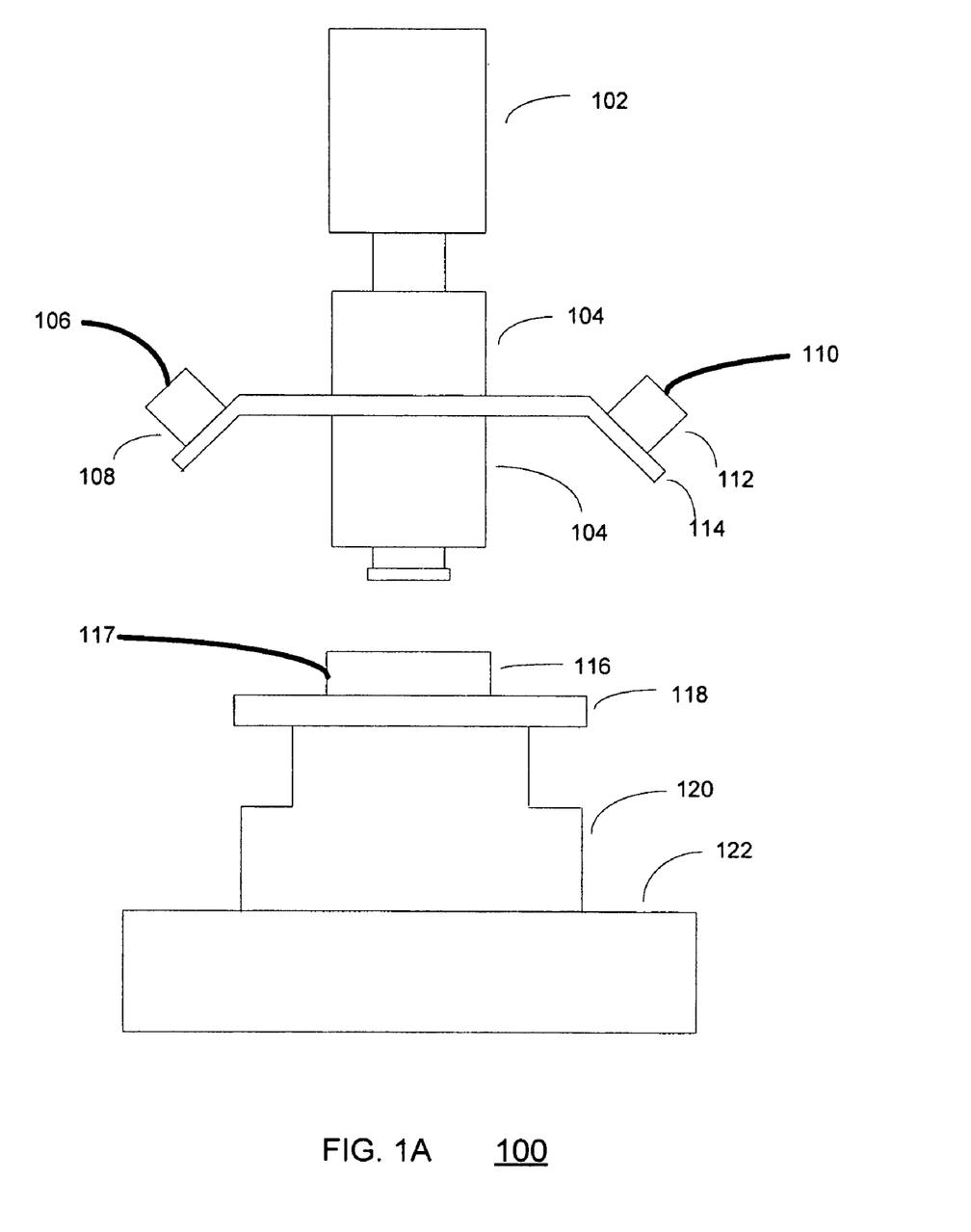
FIG. 1A is a block diagram showing an exemplary optical testing apparatus in accordance with an embodiment of the present invention.

FIG. 1A is a block diagram showing an exemplary optical testing apparatus 100 in accordance with an embodiment of the present invention. Among other things, the optical measurement apparatus includes a frame 114 integral with or mounted to a microscope 104. Optical measurement devices 108 and 112 are mounted to the frame 114, and in particular, to two mounting arms of the frame 114. The frame 114 is configured so as to aim the optical measurement devices 108 and 112 substantially toward the focal point of the microscope 104. The microscope 104 typically includes adjustable positioning controls (not shown) for adjusting the position of the microscope relative to the device under test. A CCD camera 102 is optionally coupled to the microscope 104 for, among other things, displaying the view from the microscope on a monitor.

The MEMS device under test is mounted to a board 116 that provides, among other things, the electrical connections for controlling the optical mirror positions. The board 116 is typically coupled through an interface 117 to a computer test station (described below) that generates control signals that are fed to the board 116 through the interface 117 for controlling the optical mirror positions of the MEMS device under test. The board 116 is mounted to a stage 118 that typically includes adjustable position and tilt controls. The stage 118 is mounted to a base 120 that typically also includes adjustable position and tilt controls.

The entire ensemble, including the microscope 104 and the base 120, is typically placed on a suspended table 122. Among other things, the suspended table 122 mechanically isolates the ensemble from outside shock and vibration.

In an exemplary embodiment of the present invention, the optical measurement device 112 is an optical collimator, and the optical measurement device 108 is a detector such as an infrared optical detector or angular measurement detector.

The optical collimator 112 is typically coupled to an optical fiber 110 carrying one or more light beams of various wavelengths, including optical and infrared. The optical collimator 112 typically includes adjustable collimating optics with adjustments for such things as beam size, beam focus, and beam position.

The detector 108 detects one or more light beams of various wavelengths reflected off of the optical mirror of the MEMS device under test. The detector 108 typically produces output signals that are provided to additional devices over an interface 106 for, among other things, analyzing and testing optical mirror performance.

Figure 1B:
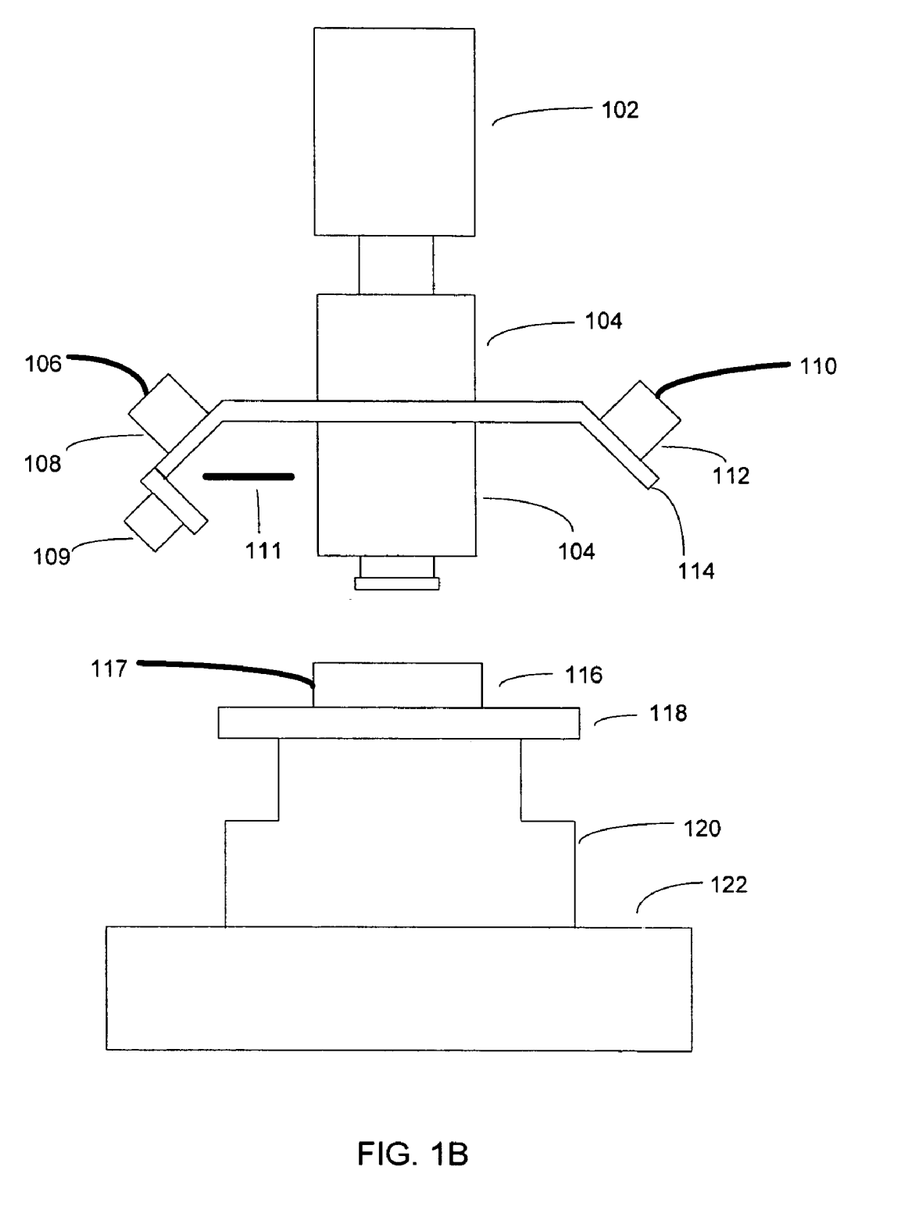
FIG. 1B is a block diagram showing an exemplary optical measurement apparatus with multiple detectors in accordance with an embodiment of the present invention.

FIG. 1B shows a variation of the optical testing apparatus 100 having multiple detectors, and, more specifically, having an additional detector 109. For example, the detector 108 may be a position sensing detector and the detector 109 may be an infrared detector. A dichroic filter 111 is used to direct optical signals to both the detector 108 and the detector 109.

Figure 2:
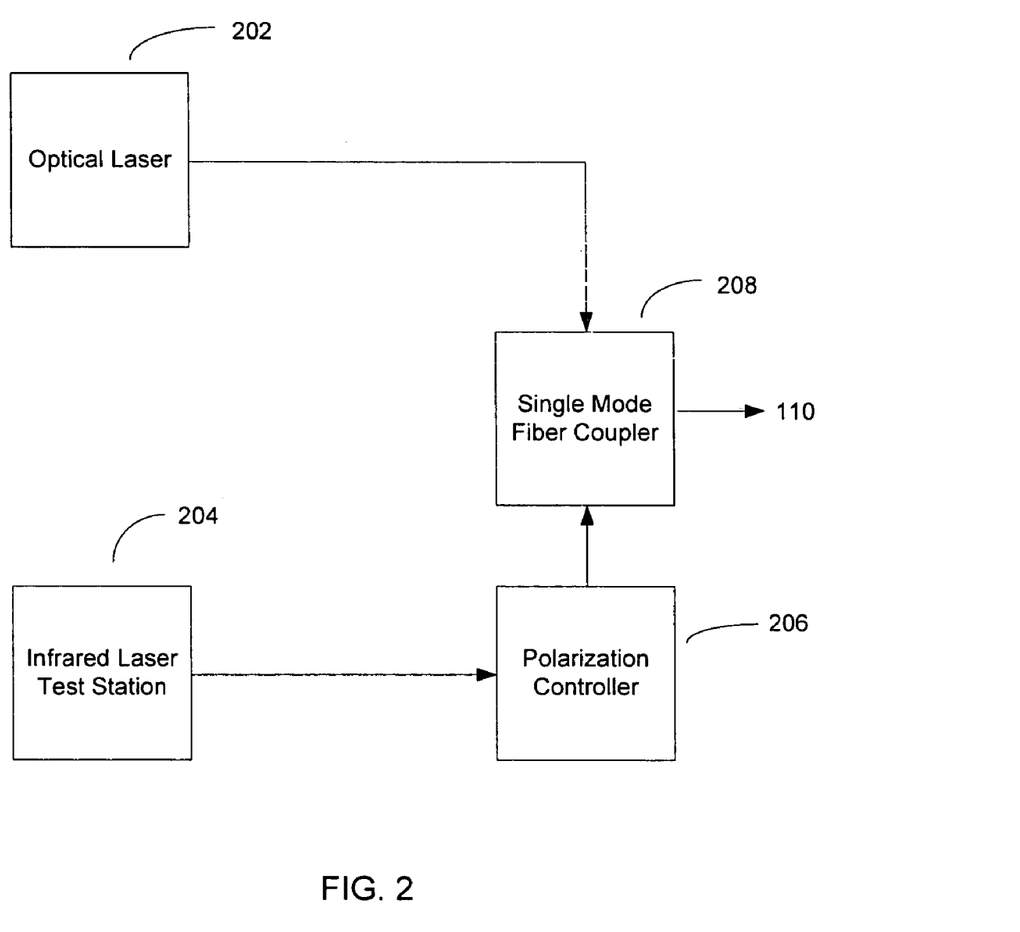
FIG. 2 is a block diagram showing various components for producing both optical and infrared light beams that are fed to the optical collimator over the optical fiber in accordance with an exemplary embodiment of the present invention.

FIG. 2 is a block diagram showing various components for producing both optical and infrared light beams that are fed to the optical collimator 112 over the single-mode optical fiber 110 in accordance with an exemplary embodiment of the present invention. An optical laser 202, such as a Thor Labs S1FC635 laser diode, is used to produce the optical light beam. An infrared laser test station 204, such as an Agilent 8164A lightwave measurement system, is used to produce the infrared light beam. The output of the optical laser 202 is fed through an optical fiber to a fiber coupler 208. The output of the infrared laser test station 204 is fed through an optical fiber to a polarization controller 206, such as a Hewlett-Packard 8169A polarization controller, and the output of the polarization controller 206 is fed through an optical fiber to the fiber coupler 208. The fiber coupler 208, such as a Newport F-CPL-L12135-P benchtop coupler/WDM, combines the optical and infrared beams onto the optical fiber 110.

It should be noted that the present invention is in no way limited to the number or types of beams used for testing. An infrared beam is typically used for detector-based testing, since detectors commonly operate in the infrared spectrum. An optical beam is typically used for visual inspection of optical mirror characteristics through the microscope 104.

Figure 3:
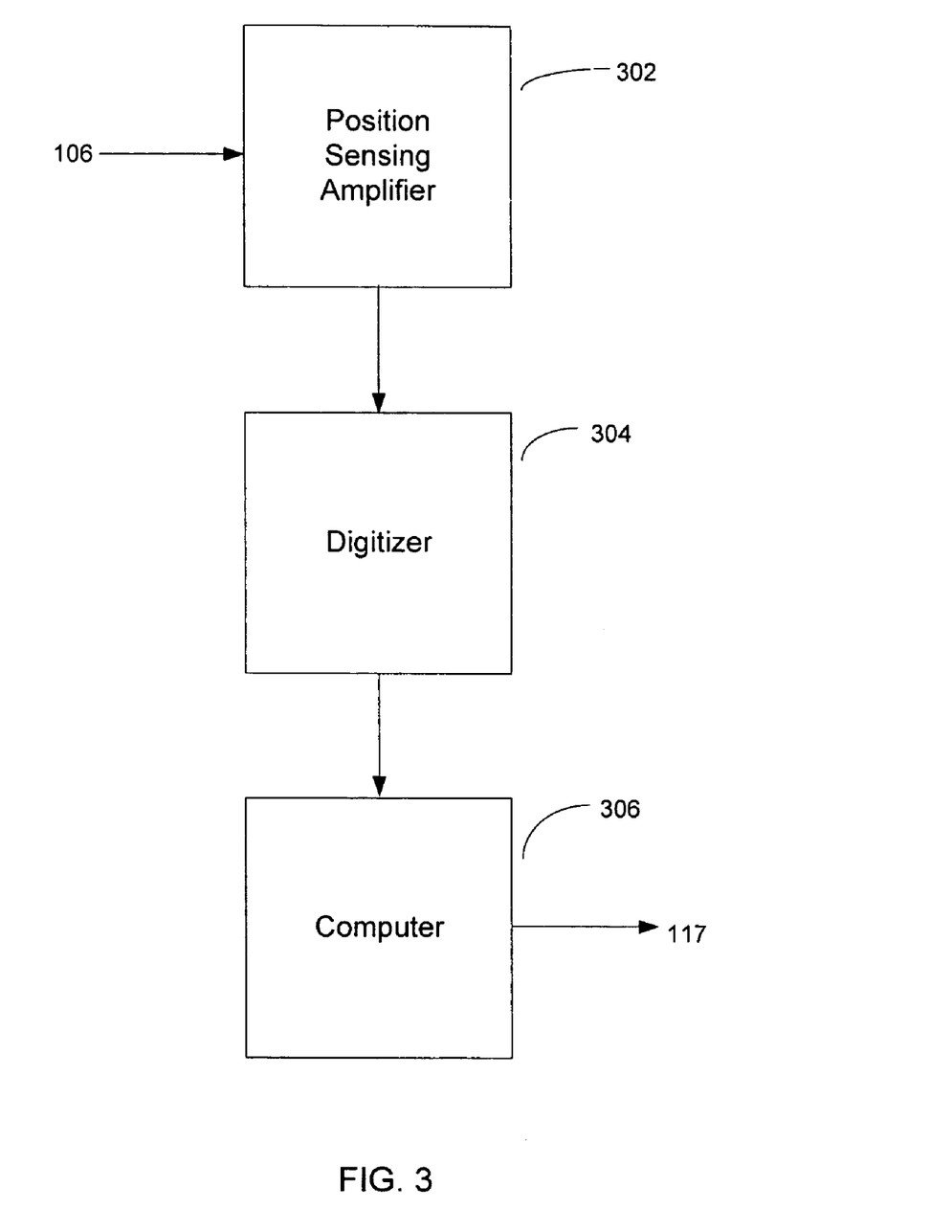
FIG. 3 is a block diagram showing various components for analyzing and testing optical mirror performance based upon signals generated by an angular measurement detector in accordance with an embodiment of the present invention.

FIG. 3 is a block diagram showing various components for analyzing and testing optical mirror performance based upon signals generated by an angular measurement detector 108 in accordance with an embodiment of the present invention. The signals generated by the angular measurement detector 108 are fed via the interface 106 to a position sensing amplifier 302, such as an On-Trak OT301 precision position sensing amplifier. The output of the position sensing amplifier 302 is fed to a digitizer 304, such as a National Instruments SCB-68 digitizer. The output of the digitizer 304 is fed to a computer 306. The computer 306 typically runs a computer program for analyzing the signals received from the angular measurement detector 108 and for generating control signals over the interface 117 for controlling the position of the optical mirror on the MEMS device under test. In an exemplary embodiment of the present invention, the computer program is implemented using LabView(™).

Figure 4:
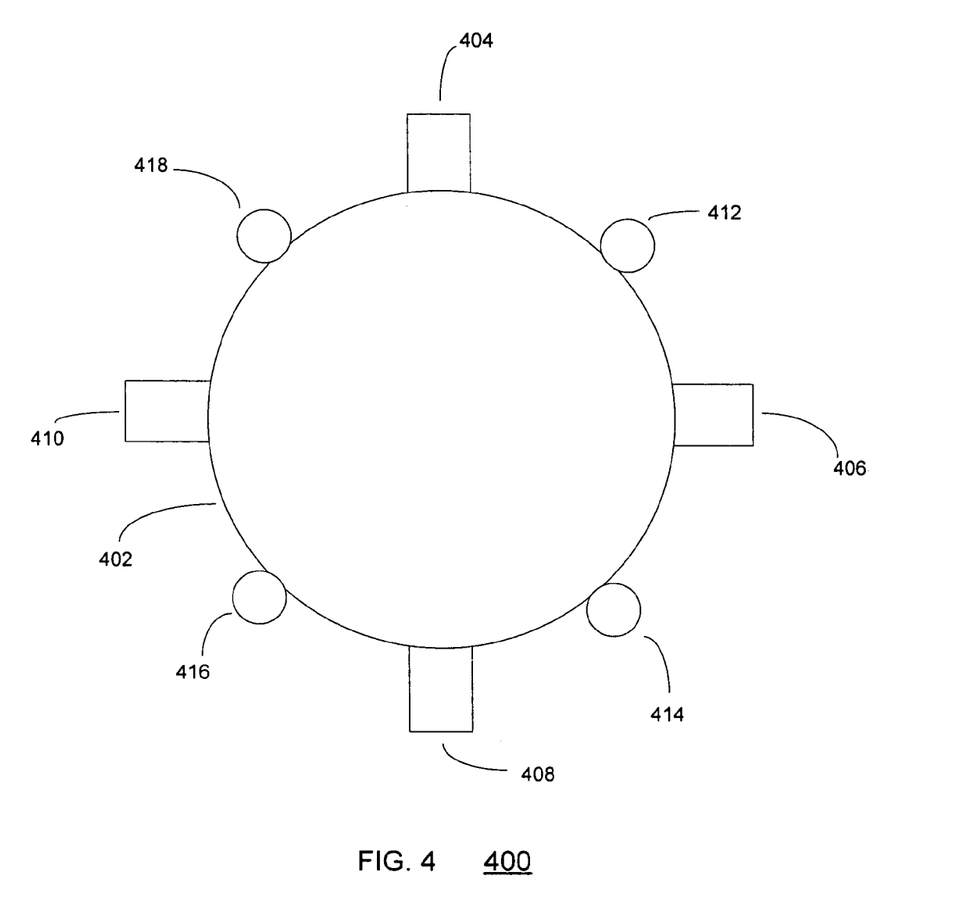
FIG. 4 shows an exemplary optical mirror configuration in accordance with an embodiment of the present invention.

FIG. 4 shows an exemplary optical mirror configuration 400 in accordance with an embodiment of the present invention. Among other things, the optical mirror configuration 400 includes an optical mirror 402 that is suspended by four flexures 404, 406, 408, and 410. The four flexures 404, 406, 408, and 410 act as a gimbal suspension to allow the mirror 402 to pivot along the x and y axes, where the x axis essentially passes through flexures 406 and 410 and the y axis essentially passes through flexures 404 and 408. The position of the optical mirror 402 is controlled through four electrodes 412, 414, 416, and 418, and specifically through electrostatic forces generated when voltages are applied to the electrodes 412, 414, 416, and 418. The optical mirror 402 can be placed in different positions by controlling the voltages applied to each of the electrodes 412, 414, 416, and 418.

The LabView program running on the computer 306 typically provides both manual and automatic test controls. For manual testing, the LabView program typically enables a person to control the position of the optical mirror 402 and run certain tests with the optical mirror 402 in a particular position. For automatic testing, the LabView program typically runs various tests while placing the optical mirror 402 in different positions. For example, the LabView program might cycle the optical mirror 402 through a number of different positions and measure the amount of deflection of the light beam at each of the optical mirror positions.

In an exemplary embodiment, the LabView code is designed in a hierarchical fashion. At the highest level of the hierarchy is a mirror control module. This is the module from which the program is run and is where all measurements begin. Mirror control presents the user with a set of three list boxes. One list box is for the customer, one list box is for the die number, and one list box is for the mirror number. There are also three buttons on the mirror control front panel, namely a GO button, a QUIT button, and an OPEN ALL button. When mirror control is run, the program loops, waiting for one of these buttons to be pressed. If the OPEN ALL button is pressed, then all of the switches in the switch matrix are opened, thus effectively disconnecting the device under test from the power supply. The program then continues looping. If the QUIT button is pressed, then the program stops looping and ends. If the GO button is pressed, then the program evaluates the choices from the list boxes and branches accordingly.

The next level in the program hierarchy is a level consisting of customer modules. The program invokes a particular customer module based upon the user's selection in the "customer" list box in mirror control.

The next level in the program hierarchy is a level consisting of die modules. The customer module invokes a particular die module based upon the user's selection in the "die number" list box.

The next level in the program hierarchy is a level consisting of mirror modules. The die module invokes a particular mirror module based upon the user's selection in the "mirror number" list box. Each mirror module typically displays a representation of the mirror configuration it is meant to measure, including a mockup of the tether positions and the electrode configuration. Each mirror module typically also presents a number of list boxes, one for each of the actuation electrodes for the mirror (typically four). Each list box typically presents two choices to the user, specifically a "not connected" choice and a "DC offset" choice. Each mirror module typically also presents three buttons to the user, namely a GO button, an AUTO button, and a DONE button. When selected by the user, the DONE button causes the mirror module to exit and return to the mirror control module at the top of the program hierarchy. When selected by the user, the AUTO button causes the mirror module to carry out an automated measurement of the mirror, disregarding the settings of the "actuation electrode" list boxes, specifically by invoking a "run setup for auto" lower level function (described below). When selected by the user, the GO button causes the mirror module to perform customized measurements based upon the user's selections in the "actuation electrode" list boxes, specifically by invoking a "run setup 2" lower level function (described below).

Figure 5:
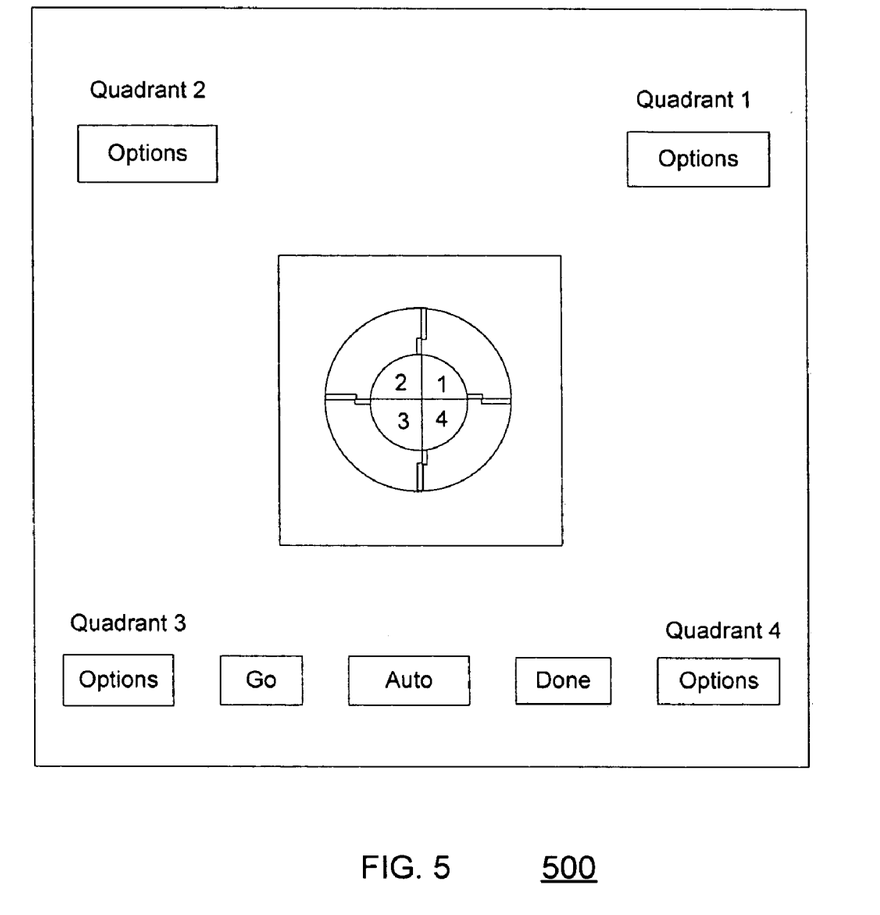
FIG. 5 shows an exemplary LabView screen produced by a mirror module from which manual and automatic testing can be controlled in accordance with an embodiment of the present invention.

FIG. 5 shows an exemplary LabView screen 500 produced by a mirror module from which manual and automatic testing can be controlled in accordance with an embodiment of the present invention. In the center of the LabView screen 500 is a representation of the optical mirror 402 divided into four quadrants. The position of the optical mirror 402 is controlled through electrodes that reside in each of the four quadrants. An "actuation electrode" list box ("options") is provided for each of the four quadrants. The "options" list box allows a person select various test options for testing a particular quadrant. The LabView screen 500 also includes a GO button, an AUTO button, and a DONE button, for controlling manual and automatic testing as described above.

The final level in the program hierarchy consists of measurement and user input functions. Some exemplary measurement and user input functions include a "run setup for auto" function, a "run setup 2" function, an "eneter sampling" function, an "enter sampling and ramp" function, and a "report cover" function.

The "report cover" function adds information about the device under test, such as the serial number, mirror tested, test date, test start time, applied voltage, and direction of testing (e.g., the order of electrodes actuated).

The "enter sampling" function and the "enter sampling and ramp" function solicit and obtain user inputs for the "run setup 2" function and the "run setup for auto" function, respectively. The information entered into these functions include such things as a duration of the test (typically in minutes, with a value of zero indicating an indefinite test duration), a maximum voltage, a step size, a zero hold time, a direction of electrode actuation for automated testing (e.g., clockwise or counterclockwise), a serial number, and sampling information. The sampling information determines the frequency at which test samples are taken and the amount of data stored. Specifically, the more test samples that are stored, the lower the frequency at which test samples are taken due to delays caused by the storage process due to opening, appending, and closing a file on the computer. For example, saving every Nth test sample allows for a higher sampling rate compared to saving every test sample.

The "run setup 2" function is invoked by the mirror module when the GO button is selected. The "run setup 2" function uses the time and sample numbers from the "enter sampling" function to set the duration and sampling parameters for the test. The "run setup 2" function also applies the actuation voltage chosen in the mirror module to the electrodes. While the test is running, the user inputs such information as maximum voltage, step size, and whether to ramp up to the maximum voltage or step to the maximum voltage. The user can stop the test using a "stop" button, at which time the test is terminated and the program returns to the highest level of the program hierarchy.

The "run setup for auto" function is invoked by the mirror module when the AUTO button is selected by the user. The "run setup for auto" function is similar to the "run setup 2" function, except is always ramps to the maximum voltage, which is entered by the user through the "enter sampling and ramp" function. Also, the "run setup for auto" function disregards any electrode connections chosen in the mirror module, and instead typically tests all electrodes individually as well as adjacent pairs of electrodes, each for the amount of time specified by the user through the "enter sampling and ramp" function. During the test, all non-actuated electrodes are typically grounded, and the electrodes are actuated in order, either clockwise or counterclockwise, as specified by the user through the "enter sampling and ramp" function. The zero hold value specified by the user adds a specified wait time to the end of each test in order to allow any excess charge to drain off of the electrode. The user can stop the test using a "stop" button, at which time the test is terminated and the program returns to the highest level of the program hierarchy. It should be noted that, in a particular embodiment, the "stop" button may need to be pressed more than once to end the test, particularly if the test is not testing the last electrode or electrode pair in the sequence at the time the "stop" button is first pressed.

The various manual and automatic tests typically involve the LabView program analyzing the output of the detector 108 with respect to the position of the optical mirror 402. The LabView program typically displays test status information and results in any of a variety of formats. For example, the LabView program might display a plot of the angular deflection of the light beam with respect to the voltage applied to an electrode.

Figure 6:
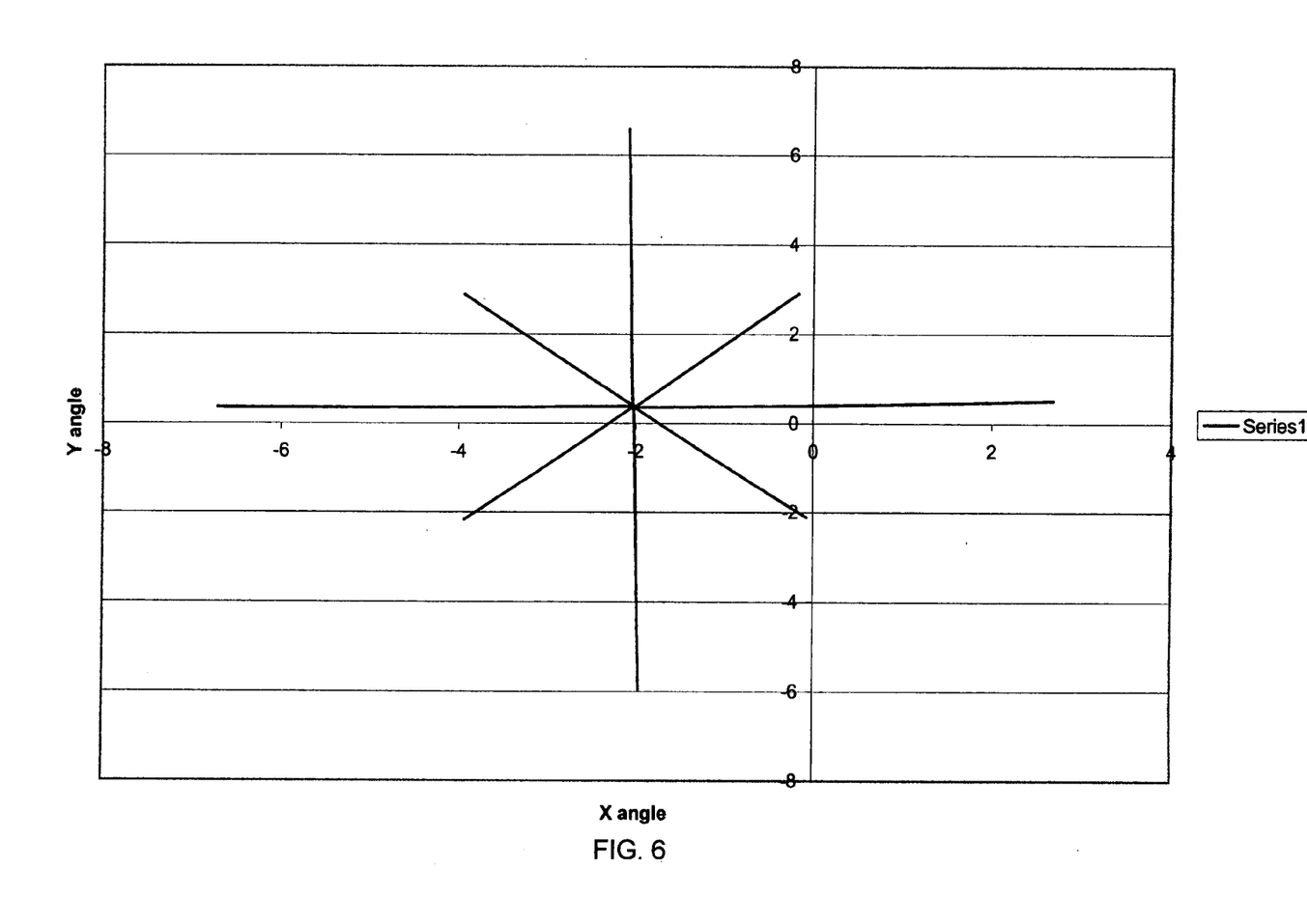
FIG. 6 shows an exemplary angular map produced by the LabView program in accordance with an embodiment of the present invention.

FIG. 6 shows an exemplary angular map produced by the LabView program.

Figure 7:
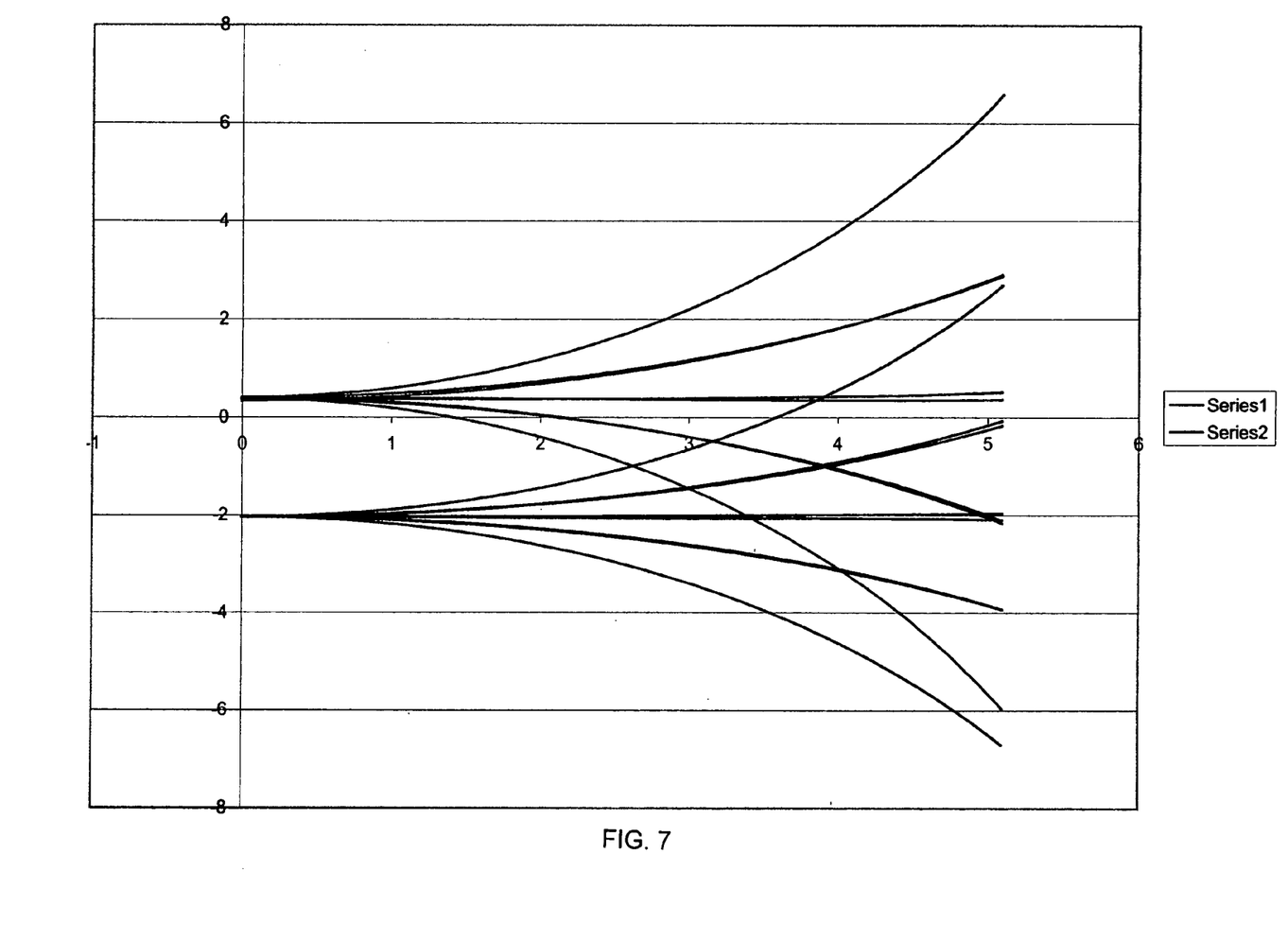
FIG. 7 shows an exemplary plot produced by the LabView program in accordance with an embodiment of the present invention.

FIG. 7 shows an exemplary plot produced by the LabView program.

In an alternate embodiment of the present invention, the angular measurement detector is replaced with an infrared optical detector. The infrared optical detector feeds output signals to the computer. A program, such as a LabView program, analyzes the signals received from the infrared optical detector and generates control signals for controlling the optical mirror on the MEMS device under test. In this case, the LabView program includes logic for measuring certain optical characteristics of the optical mirror, such as intensity and dispersion. Again, the LabView program typically provides for both manual and automated testing.

It should be noted that the present invention is in no way limited to any particular type of focusing device. The focusing device is typically a microscope, but may be any device capable of aligning the optical measurement devices mounted on the frame to the MEMS device under test.

It should be noted that the present invention is in no way limited to any particular type of frame for mounting the optical measurement devices. Frames of various shapes and sizes can be configured to hold one, two, or more optical measurement devices. The frame can be made from any of a variety of materials, including, but in no way limited to, aluminum, steel, and plastic.

It should be noted that the present invention is in no way limited to any particular types of optical measurement devices.

It should be noted that the present invention is in no way limited to any particular types of optical test equipment used in conjunction with the frame-mounted optical measurement devices.

It should be noted that the frame may be produced separately from and specifically for a particular focusing device. A frame that is mountable to a focusing device should be considered an embodiment of the present invention in and of itself. The frame is in no way limited to any particular material or shape.

It should be noted that the present invention is in no way limited to any particular types of tests that can be run by the computer under control of the computer program nor to any particular displays and outputs generated thereby.

It should be noted that the computer program is in no way limited to any particular architecture, hierarchy, or logic flow implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the logic for manual and automated testing is implemented as a set of computer program instructions that is converted into a computer executable form, stored as such in a computer readable medium, and executed by a microprocessor within the computer under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, HTML, or LabView) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. An optical measurement system comprising a viewing device having disposed thereon a frame for mounting a light source and a light detector, wherein the frame moves along with focusing movements of the viewing device, and wherein the frame is configured in such a way that the light source and the light detector are focused on a micromachined optical device when the viewing device is focused on the micromachined optical device, the optical measurement system further comprising at least one processing device operably coupled to generate control signals for controlling the micromachined optical device and to process output signals produced by the light detector.

2. The optical measurement system of claim 1, wherein the frame is integral to the viewing device.

3. The optical measurement system of claim 1, wherein the frame is mounted to the viewing device.

4. The optical measurement system of claim 1, wherein the viewing device comprises a microscope.

5. The optical measurement system of claim 1, wherein the light detector comprises one of:
   an infrared optical detector; and
   an angular measurement detector.

6. The optical measurement system of claim 1, wherein the light detector is operably coupled to receive a light beam reflected off of an optical mirror of the micromachined optical device.

7. The optical measurement system of claim 1, wherein the at least one processing device comprises a position sensing amplifier.

8. The optical measurement system of claim 1, wherein the at least one processing device comprises a digitizer.

9. The optical measurement system of claim 1, wherein the at least one processing device comprises a computer.

10. The optical measurement system of claim 9, wherein the computer is programmed to process the output signals produced by the light detector.

11. The optical measurement system of claim 10, wherein the computer is programmed to present the processed output signals in a selected format.

12. The optical measurement system of claim 1, wherein the light source comprises at least one laser for producing the light beam.

13. The optical measurement system of claim 12, wherein the laser operates in one of:
   the visible spectrum; and
   the infrared spectrum.

14. The optical measurement system of claim 1, wherein the at least one processing device comprises:
   control logic operably coupled to control the position of an optical mirror of the micromachined optical device;
   data acquisition logic operably coupled to receive signals from at least one optical measurement device; and
   analysis logic operably coupled to analyze the received signals based upon at least the position of the optical mirror of the micromachined optical device.

15. The optical measurement system of claim 14, wherein the control logic is operably coupled to cycle the optical mirror of the micromachined optical device through a plurality of positions and wherein the analysis logic is operably coupled to analyze the received signals when the optical mirror of the micromachined optical device is at each of the plurality of positions.

16. The optical measurement system of claim 15, wherein the plurality of positions are determined by an automated program.

17. The optical measurement system of claim 15, wherein the plurality of positions are determined through information entered manually.

18. An apparatus comprising:
   viewing means for viewing a micromachined device under test; and
   mounting means for mounting a light source and a light detector, wherein the frame moves along with focusing movements of the viewing means, and wherein the frame is configured in such a way that the light source and the light detector are aligned with a micromachined device under test when the viewing means is focused on the micromachined device under test; and
   controlling means for controlling the micromachined device under test; and
   processing means for processing output signals produced by the light detector.

19. The apparatus of claim 18, wherein the frame is integral to the viewing means.

20. The apparatus of claim 18, wherein the frame is mounted to the viewing means.

21. The apparatus of claim 18, wherein the viewing means comprises a microscope.

* * * * *